United States Patent
Hammer et al.

(10) Patent No.: US 9,284,787 B2
(45) Date of Patent: Mar. 15, 2016

(54) DRILL BIT AND CUTTING HEAD FOR DRILL BIT

(71) Applicant: Black & Decker Inc., Newark, DE (US)

(72) Inventors: Andreas Hammer, Tittling (DE); Steve Brocket, Durham (GB); Christoph Gastinger, Hutthum (DE); Christian Bluemel, Waldkirchen (DE)

(73) Assignee: Black & Decker Inc., New Britain, CT (US)

( * ) Notice: Subject to any disclaimer, the term of this patent is extended or adjusted under 35 U.S.C. 154(b) by 440 days.

(21) Appl. No.: 13/901,917

(22) Filed: May 24, 2013

(65) Prior Publication Data

US 2013/0319774 A1    Dec. 5, 2013

(30) Foreign Application Priority Data

May 29, 2012    (EP) .................................. 12169829

(51) Int. Cl.
| | | |
|---|---|---|
| *E21B 10/44* | (2006.01) | |
| *B23B 51/02* | (2006.01) | |
| *B28D 1/14* | (2006.01) | |
| *E21B 10/58* | (2006.01) | |

(52) U.S. Cl.
CPC .................. *E21B 10/44* (2013.01); *B23B 51/02* (2013.01); *B28D 1/146* (2013.01); *E21B 10/58* (2013.01); *B23B 2226/75* (2013.01); *B23B 2251/18* (2013.01); *B23B 2251/44* (2013.01)

(58) Field of Classification Search
CPC ......... E21B 10/44; E21B 10/58; E21B 10/36; B23B 51/02; B23B 2226/75; B23B 2251/14; B23B 2251/204; B23B 2251/18; B23B 2251/44; B28D 1/146; Y10T 408/9097
See application file for complete search history.

(56) References Cited

U.S. PATENT DOCUMENTS

| | | | |
|---|---|---|---|
| 1,106,966 | A | 8/1914 | Pauli |
| 2,099,677 | A | 11/1937 | Cunningham |
| 2,107,286 | A | 2/1938 | Cunningham |
| 2,145,466 | A | 1/1939 | Urschel |
| 2,179,689 | A | 11/1939 | Earnheart |
| 2,614,813 | A | 10/1952 | Shepherd |
| 2,776,819 | A | 1/1957 | Brown |
| 2,879,973 | A | 3/1959 | Saxman |
| 2,890,021 | A | 6/1959 | Sandvig |

(Continued)

FOREIGN PATENT DOCUMENTS

| | | |
|---|---|---|
| DE | 4012772 A1 | 10/1991 |
| DE | 202007002120 U1 | 6/2008 |
| DE | 102008062298 A1 | 8/2010 |

OTHER PUBLICATIONS

A. Klein—European Search Report (EP 12 16 9829)—Oct. 16, 2012—The Hague.

(Continued)

*Primary Examiner* — Yong-Suk (Philip) Ro
(74) *Attorney, Agent, or Firm* — Scott B. Markow

(57) ABSTRACT

A cutting head for a drill bit comprises four substantially identically shaped cutting arms extending radially from a common central axial point, each cutting arm comprising a cutting edge extending, outwardly and axially backwards from the common central axial point. The cutting edges are equianguiarly spaced apart from each other about the central axis of the cutting head. Each cutting, arm further comprises a side chamfer extending between its radially outer face and its rotationally trailing side face.

20 Claims, 7 Drawing Sheets

(56) References Cited

U.S. PATENT DOCUMENTS

| | | |
|---|---|---|
| 2,973,047 A | 2/1961 | Edgar |
| 3,294,186 A | 12/1966 | Buell |
| 3,736,634 A | 6/1973 | Sonnie |
| 4,026,372 A | 5/1977 | Hampson |
| 4,445,580 A | 5/1984 | Sahley |
| 4,729,441 A | 3/1988 | Peetz et al. |
| 4,903,787 A | 2/1990 | Moser |
| 4,984,944 A | 1/1991 | Pennington, Jr. et al. |
| 5,154,549 A | 10/1992 | Isobe et al. |
| 5,172,775 A | 12/1992 | Sheirer et al. |
| 5,184,689 A | 2/1993 | Sheirer et al. |
| 5,220,967 A | 6/1993 | Monyak |
| 5,238,074 A | 8/1993 | Tibbitts |
| 5,273,380 A | 12/1993 | Musacchia et al. |
| 5,482,124 A | 1/1996 | Haussmann et al. |
| 5,735,648 A | 4/1998 | Kleine et al. |
| 5,836,410 A | 11/1998 | Kleine |
| 5,918,105 A | 6/1999 | Anjanappa et al. |
| 6,145,606 A | 11/2000 | Haga |
| 6,174,111 B1 | 1/2001 | Anjanappa et al. |
| 6,260,637 B1 | 7/2001 | Haussmann et al. |
| 6,283,232 B1 | 9/2001 | Batliner et al. |
| 6,345,940 B2 | 2/2002 | Anjanappa et al. |
| 6,374,931 B1 | 4/2002 | Nieves |
| 6,405,813 B1 | 6/2002 | Kleine et al. |
| 6,431,295 B1 | 8/2002 | Kleine et al. |
| 6,446,741 B1 | 9/2002 | Kersten et al. |
| 6,450,272 B2 | 9/2002 | Hauptmann et al. |
| 6,450,273 B1 | 9/2002 | Kleine et al. |
| 6,514,019 B1 | 2/2003 | Schulz |
| 6,550,555 B2 | 4/2003 | Huber et al. |
| 6,551,036 B2 | 4/2003 | Heule |
| 6,565,296 B2 | 5/2003 | McKinley et al. |
| 6,702,047 B2 | 3/2004 | Huber |
| 6,817,429 B2 | 11/2004 | Sollami |
| 6,848,869 B2 | 2/2005 | Stokey |
| 6,868,924 B2 | 3/2005 | Haussmann |
| 6,902,359 B2 | 6/2005 | Kraemer |
| 6,910,838 B2 | 6/2005 | Fuss |
| 6,984,094 B2 | 1/2006 | Nuzzi et al. |
| 6,986,628 B2 | 1/2006 | Mast et al. |
| 7,001,120 B2 | 2/2006 | Moser et al. |
| 7,011,478 B2 | 3/2006 | Stokey et al. |
| 7,018,145 B2 | 3/2006 | Mast et al. |
| 7,114,893 B2 | 10/2006 | Mast et al. |
| 7,182,556 B2 | 2/2007 | Takiguchi et al. |
| 7,241,089 B2 | 7/2007 | Mast et al. |
| 7,371,035 B2 | 5/2008 | Mast et al. |
| 7,497,282 B2 | 3/2009 | Batliner et al. |
| 7,547,166 B2 | 6/2009 | Nuzzi et al. |
| 7,559,382 B2 | 7/2009 | Koch |
| 7,628,232 B2 | 12/2009 | Koch et al. |
| 7,861,807 B2 | 1/2011 | Probst et al. |
| 2001/0013430 A1 | 8/2001 | Hauptmann et al. |
| 2007/0278016 A1* | 12/2007 | Koch .................. B23B 51/02 175/420.1 |
| 2008/0110679 A1 | 5/2008 | Koch |
| 2008/0118317 A1 | 5/2008 | Assel |
| 2008/0149399 A1 | 6/2008 | Koch et al. |

OTHER PUBLICATIONS espacenet.com—English Abstract—German Patent Appln. No. DE 102008062298-A1—printed Jul. 16, 2013—2 pages.

patbase.com—Machine Translation—German Patent Appln. No. DE 102008062298-A1—printed Jan. 5, 2016—9 pages.

* cited by examiner

DRILL BIT AND CUTTING HEAD FOR DRILL BIT

CROSS REFERENCE TO RELATED APPLICATIONS

This application claims priority, under 35 U.S.C. §119, to European Patent Application No. 12169829.4, filed May 29, 2012, entitled "Drill Bits," which is incorporated herein by reference.

TECHNICAL FIELD

The present invention relates to drill bits and cutting heads for drill bits, in particular for drilling concrete and rock.

BACKGROUND

Drill bits may comprise a steel fluted section with a hard material cutting head, for example a tungsten carbide head, attached at one end. Located at the other end of the shaft is a shank to releasably connect to a tool holder or a drill or the like, for example, a rotary drill, a rotary percussion drill or a rotary hammer. In order to minimise the amount of power required to drive the drill, the cutting head conventionally comprises two opposing main cutting arms extending from a central point. Conventionally, the drilling of holes with a cross-section closely approaching a geometric circle is assisted by provision of two auxiliary hard material head parts axially set back from the main cutter and radially set back from the outer diameter swept by the end of the main cutting arms, which are either connected to the main cutting head as in U.S. Pat. No. 7,861,807, or are spaced apart from the main cutting plate on the head of the steel fluted section as in European Patent No. EP 1 506 830.

SUMMARY

The present disclosure seeks to provide improved drill bits and improved cutting heads for drill bits.

A first aspect of the disclosure provides a cutting head for a drill bit, the cutting head comprising four substantially identically shaped cutting arms extending radially from a common central axial point, each cutting arm comprising a cutting edge extending outwardly and axially backwards from the common central axial point. The cutting edges are equiangularly spaced apart from each other at all points about the central axis of the cutting head. Each cutting arm further comprises a side chamfer extending between its radially outer face and its rotationally trailing side face.

Each cutting edge may extend in a straight unbroken line from the central axial point to the outer radius of the cutting head. Each cutting edge may comprise three or more sections, for example four sections, wherein the point angle between corresponding sections of opposing cutting edges is different to the point angle of any neighbouring sections. Each section may transition to its neighbouring sections at a transition having a large curve radius.

Each cutting arm may comprise two side faces falling axially away from each cutting edge, wherein each side face comprises a number of side face sections and transitions, corresponding to the sections and transitions of the cutting edge. The two side faces of each cutting arm may be angled symmetrically about the longitudinal central plane of the cutting arm.

A further aspect of the disclosure provides a drill bit including a cutting head according to the first aspect of the disclosure.

Advantages of the disclosed inventions may include one or more of the following. An advantage of the four identically shaped cutting arms of the cutting head of the present invention is that the beat force or hammering force is evenly distributed to all four cutting edges, rather than being distributed unequally between a main cutting edge and auxiliary cutting edges. This even distribution of the beat force over a larger number of cutting edges than conventional heads leads to reduced breakage of the cutting edges.

In addition, it has been found that the cutting head according to the invention does not require significantly more power to drive than conventional heads, even though it has four cutting arms extending to the same outer radius. The cutting head according to the invention improves the durability, speed and overall life of a drill bit.

Further areas of applicability will become apparent from the description provided herein. The description and specific examples herein disclosed are intended for purposes of illustration only and are not intended to limit the scope of the present disclosure.

BRIEF DESCRIPTION OF THE DRAWINGS

The invention is herein described, by way of example only, with reference to the accompanying drawings, wherein.

DETAILED DESCRIPTION

Figure 1:
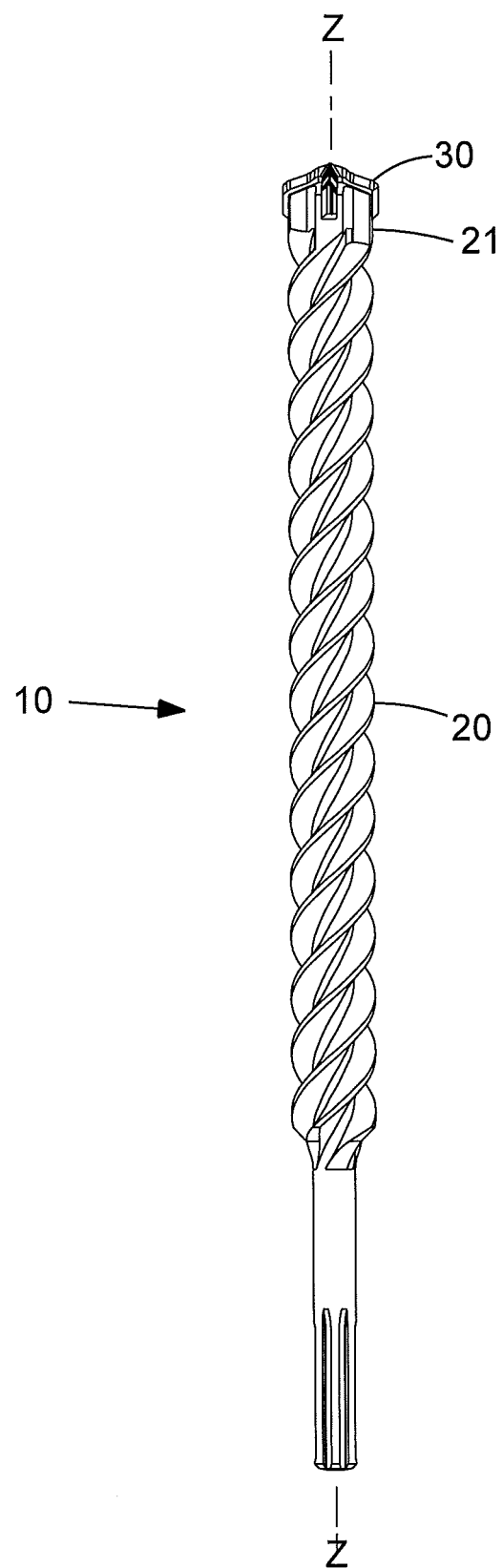
FIG. 1 is a side elevation view of a drill bit in accordance with the present disclosure.

Referring to FIG. 1, a drill bit 10 comprises a fluted section 20 and a cutting head 30. The fluted section 20 comprises four helical discharge grooves or flutes. The cutting head 30 may be joined to the fluted section 20 by any known method. For example, appropriately sized head accepting areas, which may be in the form of a roughened surface, slots, holes, or any other suitable platform area is formed at the top end 21 of the fluted section, for example by milling. The cutting head, in one piece or in component parts which together comprise the cutting head once fitted, may then be fitted and brazed into place.

Figure 11:
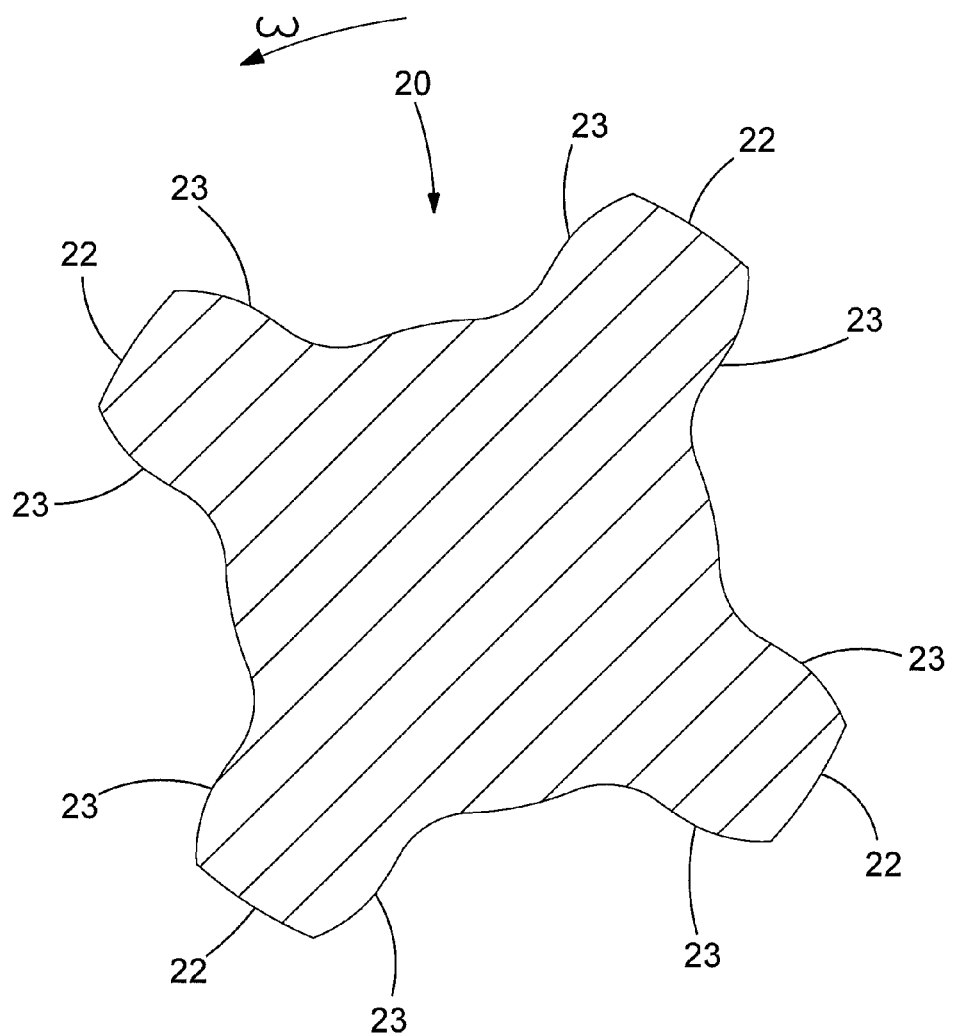
FIG. 11 is a cross sectional view of a fluted section of a drill bit in accordance with the present disclosure.

The fluted section may be formed using any known method. Preferably, the fluted section for use with the cutting head of the present invention has four flutes. As shown in FIG. 11, the fluted section may have four lands 22 joined by a web in the conventional way. The cut-away curve joining two neighbouring lands may be a smooth curve. Alternatively, the fluted section may have cut-away curves which are not smooth, to result in a cog-like cross section with protrusions 23. Such protrusions can reduce bending of the fluted section during drilling, and therefore help to prevent drill bit failure due to fatigue fracture.

Figure 2:
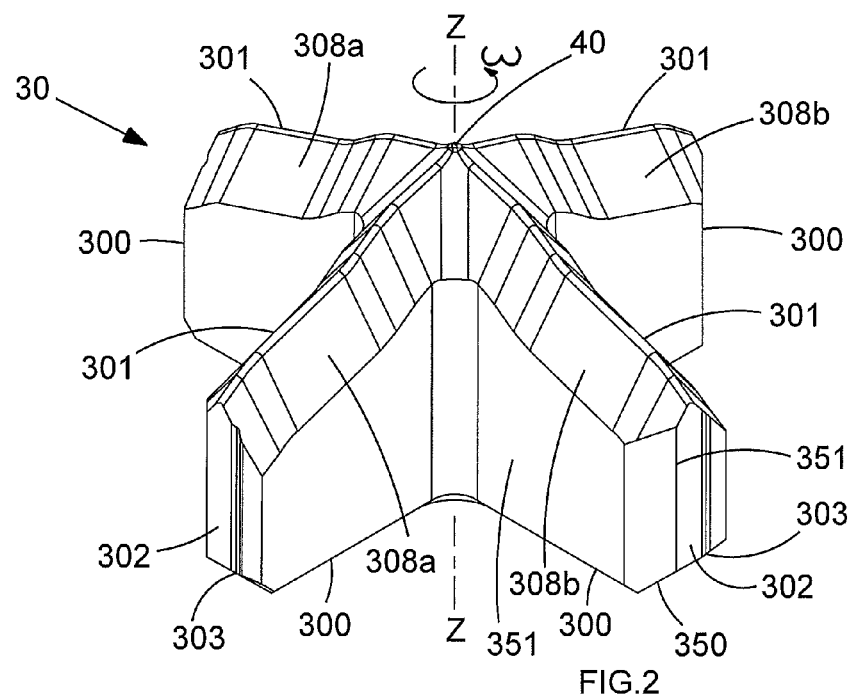
FIG. 2 is a perspective view of a cutting head for a drill bit in accordance with the present disclosure.

Turning to FIG. 2, a cutting head 30 of the present invention comprises four cutting arms 300, each of the same shape, and at right angles to both neighbouring cutting arms. Furthermore, the cutting edge 301 of each cutting arm 300 extends from a common central axial point 40 to the outermost radius of the cutting edge, along a straight line. Each cutting arm 300 has an axis of reflectional symmetry along the cutting edge 301, until the arm approaches the outermost radius.

Figure 4:
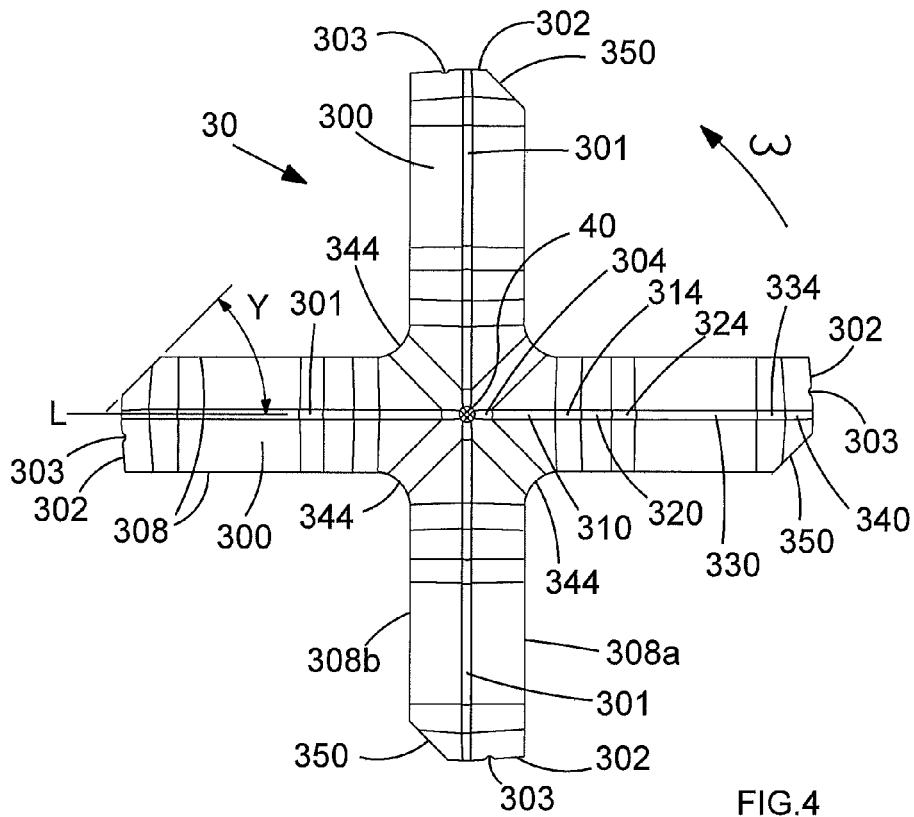
FIG. 4 is a top plan view of the cutting head of FIG. 2

Each cutting arm may be symmetric about the longitudinal central plane of the cutting arm (defined by the central axis and the cutting edge of the cutting arm), except for the formation of a side chamfer 350 extending between a radially outer face 302 of the cutting arm and a rotationally trailing side face 351 of the cutting arm. As shown in FIG. 4, the side chamfer 350 may for example have an angle (Y) of approximately 45° to a longitudinal plane (L) of the cutting arm, although it may be at a greater or smaller angle. The side chamfer 350 may be in a plane which extends parallel to the axial direction (Z) of the cutting head. The rotationally forward edge 351 of the side chamfer preferably approaches but does not intersect with the longitudinal central plane (L) of the respective cutting arm. Such a side chamfer reduces the area of the radially outer face 302 of the cutting arm which decreases the force required for drilling using the cutting head. The radially outer face 302 of each cutting arm may also include a check groove 303.

Figure 3:
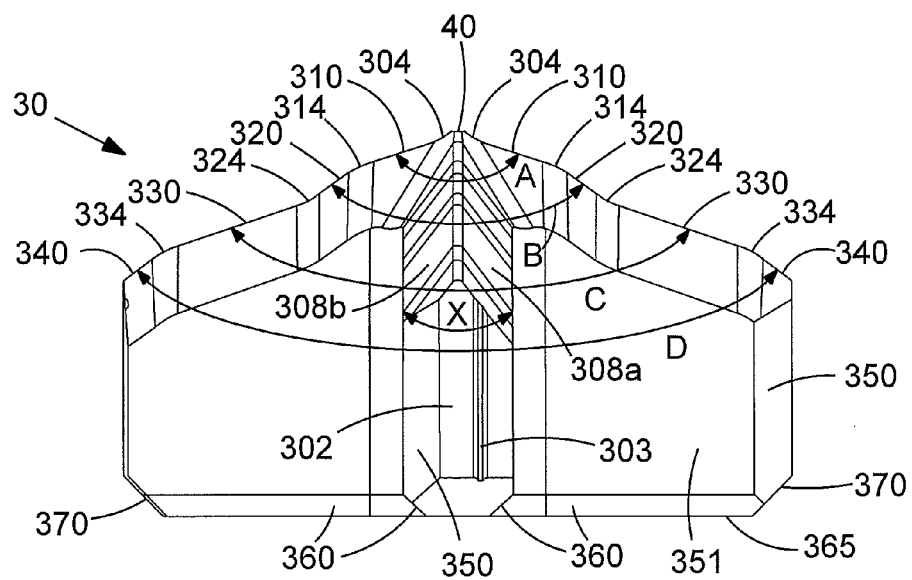
FIG. 3 is a side elevation view of the cutting head of FIG. 2.
Figure 8:
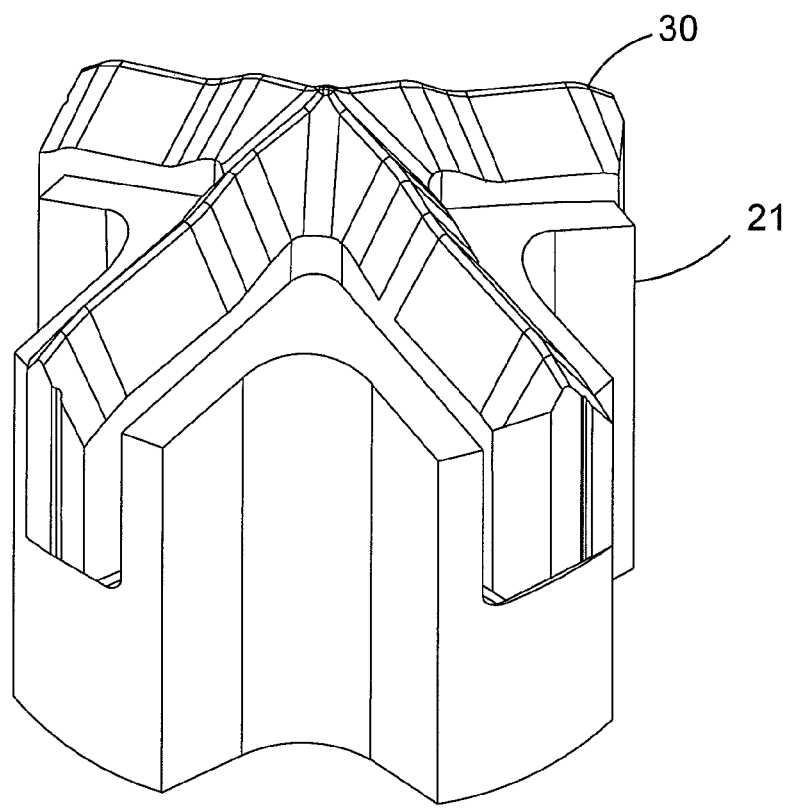
FIG. 8 is a perspective view of the cutting head of FIG. 2, set into the top part of the fluted section of a drill bit.
Figure 9:
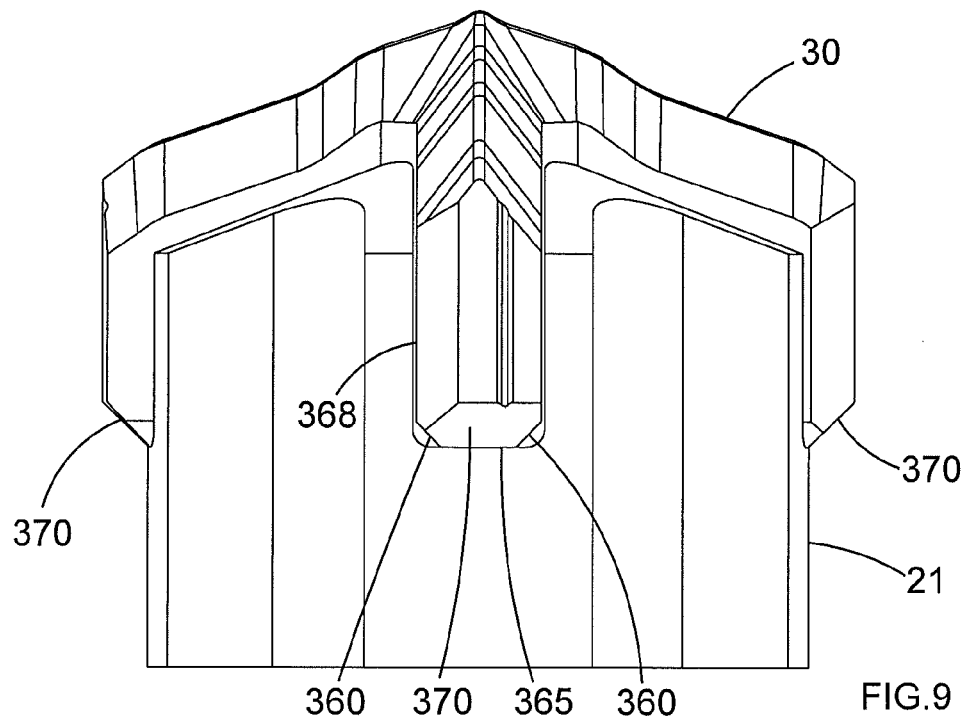
FIG. 9 is a side elevation view of the cutting head of FIG. 8.
Figure 10:
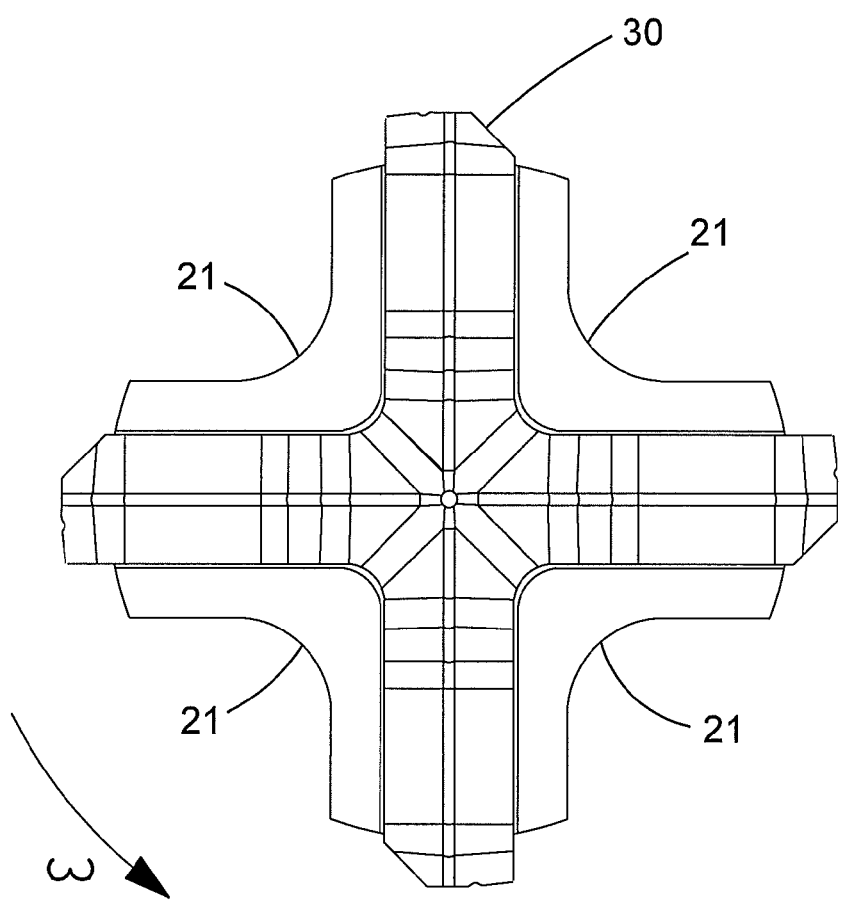
FIG. 10 is a top plan view of the cutting head of FIG. 8.

The cutting head 30 may be formed with base chamfers 360 at the base of the sides of the arms, as shown in FIG. 3. Such base chamfers 360 assist in fixing the cutting head securely into head accepting areas in the form of rectangular slots 368 in the top end 21 of the fluted section of a drill bit, as shown in FIGS. 8-10 (continuation of fluted section not shown). Such slots may have a slightly curved joining line between the walls and the bottom of the slot due to the manufacturing process, which slightly protrudes into the slot. The base chamfers 360 ensure that any such protrusions do not interfere with the proper insertion of the cutting head. Base face 365 of the cutting head 30 can closely approach a bottom surface 366 of the slot 368 regardless of any protrusions at the line joining the walls and bottom of the slot, which improves the assembly tolerances and strength.

The cutting head 30 may also be formed with end chamfers 370 at the base of the outer end of each arm 300. If the cutting head 30 is attached to the top end 21 of the drill by insertion of the arms 300 into the slots 368, end chamfers 370 may protrude from the ends of the slots 368 after assembly, as shown in FIG. 8. End chamfers 370 may be at any suitable angle, such as for example 45° to the base 365 and radially outer faces 302 of the cutting head 30. End chamfers 370 assist in drilling, for example, when drilling in rebar or similar material, such chamfers allow easy retraction of the drill bit after a drilling operation.

As shown in FIGS. 2 and 3, the four cutting arms 300 meet at a central axial point 40 which is the axially highest point of the cutting head 30. The cutting head may comprise a small rounded protruding tip of which the central axial point is the apex. Such an arrangement permits excellent performance in both centering and in speed while drilling. The central axial point 40 is joined to the most central first section 310 of the cutting edge of each cutting arm via a transition 304 having a large curve radius.

The cutting edge 301 of each identical arm is divided into four sections, 310, 320, 330, 340, of different radial lengths and angles. Each cutting edge section transitions into the next cutting edge section via a transition 314, 324, 334, having a large curve radius.

As shown in FIG. 4, a similar large curve radius transition 344 may separate each of the four cutting arms axially. Each curved transition avoids sharp transitions between adjacent non-contiguous planes, and therefore avoid points of high stress which can cause failure of the head.

A point angle (A) between opposing first sections 310 may be between 140° and 150°, for example 145°. A point angle (B) between opposing second sections 320 may be between 105° and 115°, for example 112°. A point angle (C) between opposing third sections 330 may be between 135° and 145°, for example between 140° and 142°, for example 142°. A point angle (D) between opposing fourth sections 340 may be between 100° and 110°, for example 105°.

Figure 5:
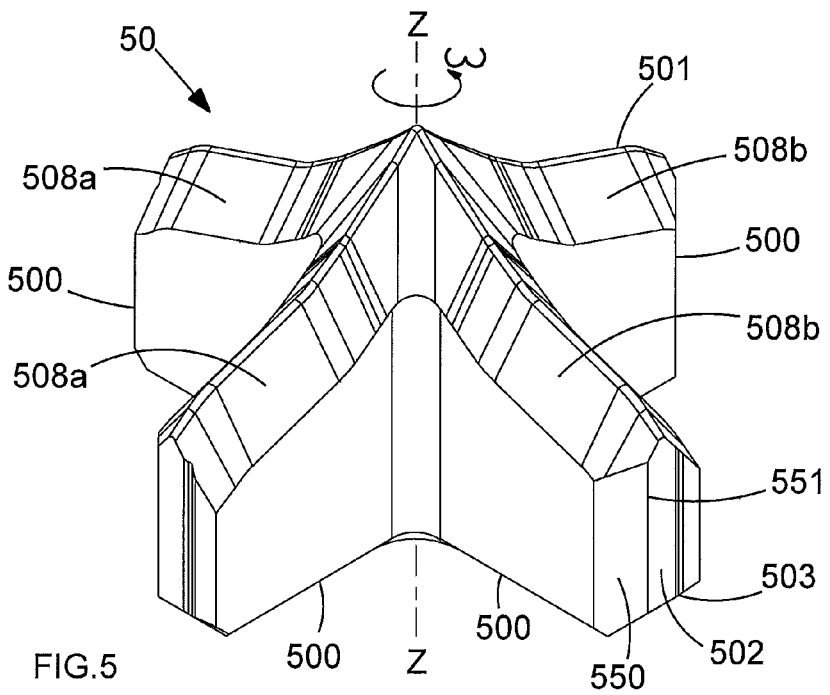
FIG. 5 is a perspective view of an alternative cutting head for a drill bit in accordance with the present disclosure.
Figure 6:
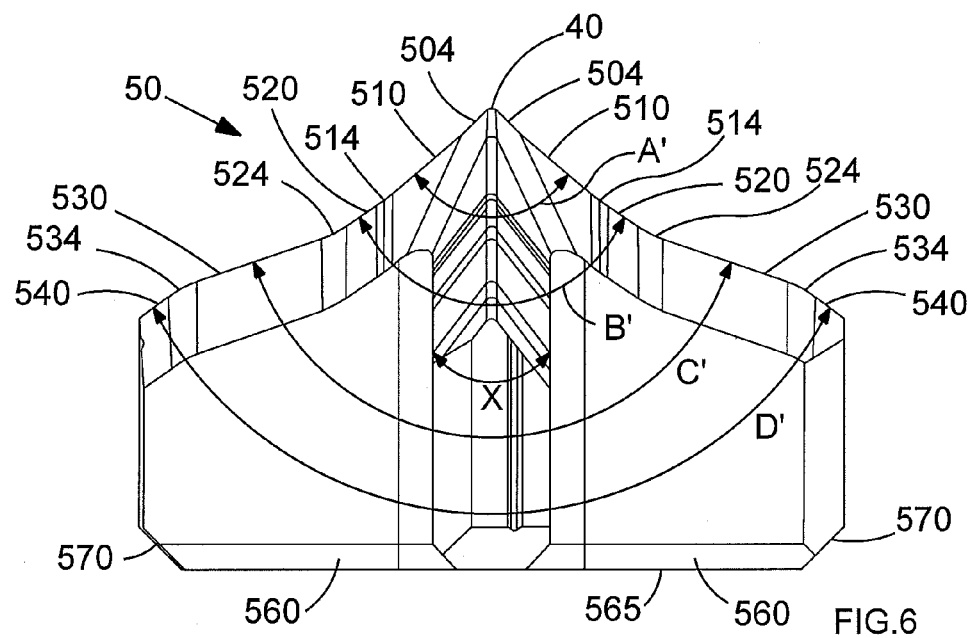
FIG. 6 is a side elevation view of the cutting head of FIG. 5.
Figure 7:
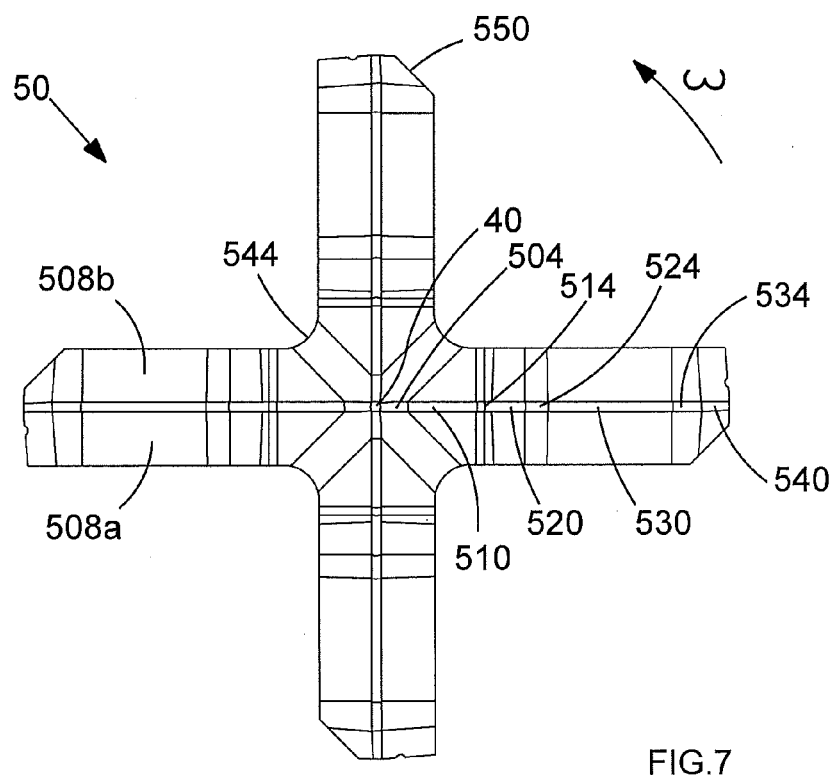
FIG. 7 is a top plan view of the cutting head of FIG. 5.

FIGS. 5-7 show an alternative embodiment of a cutting head according to the present disclosure. Cutting head 50 has parts corresponding to the parts of cutting head 30, numbered correspondingly. Hence, cutting head 50 has cutting arms 500, each with a cutting edge 501, a radially outer face 502 with a check groove 503, and a side chamfer 550 with a leading edge 551. As shown on FIG. 6, cutting head 50 has a base 565 with base chamfers 560, and end chamfers 570.

In the alternative cutting head 50, as shown in FIGS. 5 to 7, the point angle (A') between opposing first sections 510 may be between 95° and 120°, for example between 95° and 105°, for example 100°. The point angle (B') between opposing second sections 520 may be between 110° and 120°, for example 115°. The point angle (C') between opposing third sections 530 may be between 135° and 145°, for example between 140° and 142°, for example 142°. The point angle (D') between opposing fourth sections 540 may be between 100° and 110°, for example 105°

The point angles (D, D') between opposing fourth sections 340, 540, in the embodiments of FIGS. 2-4 and FIGS. 5-7, respectively, is relatively small. This improves durability of the cutting head by reducing the likelihood of breakage of the ends of the cutting arms due to drilling, and also allows the speed while drilling to be high. The point angles (C, C') between opposing third sections 330, 530, in the embodiments of FIGS. 2-4 and FIGS. 5-7, respectively, allows the speed while drilling to be high in comparison to axially flatter cutting heads.

For cutting head 30, the first section 310 of the cutting edge may comprise approximately 17% to 23%, for example 20% of the length of the entire cutting edge 301 of the cutting arm. The second section 320 may comprise approximately 8% to 13%, for example 10% of the length of the entire cutting edge. The third section 330 may comprise approximately 22% to 50%, for example 35% to 45%, for example 40% of the length of the entire cutting edge. The fourth section 340 may comprise approximately 8% to 13%, for example 10% of the length of the entire cutting edge. The transitions 304, 314, 324, 334 between the central axial point and the four sections each comprise approximately 2% to 6%, for example 5% of the length of the entire cutting edge. Such an arrangement provides a compromise between an axially protruding central area for higher drilling speed and good centering performance, with low overall power requirements to drive the cutting head while drilling. The corresponding sections 510, 520, 530, 540 and transitions 504, 514, 524, 534 of cutting head 50 may have corresponding proportions.

Two side faces 308a, 308b fall axially away from each cutting edge 301, symmetrically. The side faces 308a facing in the drilling direction (ω) will act as rake faces and relief faces 308b facing the other direction will act as relief faces. As shown in FIG. 3, each pair of side faces 308a, 308b has an internal angle (X), of approximately 80° to 90°, for example 85°, forming a relatively steep roof shape arm. The symmetry of the cutting edge causes the forces produced when drilling, in particular the beat forces, to be transmitted evenly through the cutting head and into the bottom of the slot, which reduces stresses on the connection between the cutting head and the end of the fluted section, and on the end of the fluted section itself. Cutting head 50 has corresponding side faces 508a, 508b.

The cutting head may be of a material conventionally used for cutting heads, for example, tungsten carbide. The cutting head may be made using any known method for forming parts from such material, for example by pressing or grinding.

The cutting head may be made in one piece. It is also possible to make the cutting head in more than one piece and bring the pieces together when the cutting head is attached to the end of the fluted section. For example, the cutting head could comprise three separate plates, one central plate forming two opposite arms, and two identical side plates one of which could be positioned extending from either side of the central plate, to form the other two opposing arms.

It should be understood that although the invention has been described in conjunction with specific embodiments thereof, it is evident that many alternatives, modifications and variations will be apparent to those skilled in the art. Accordingly, it is intended to embrace all such alternatives, modifications and variations that fall within the scope of the claims.

What is claimed is:

1. A cutting head. for a drill bit, the cutting head comprising:
    a front end portion centered on a central axis of the cutting head; and
    at least four substantially identically shaped cutting arms extending radially outward from the front end portion a substantially identical radial distance from the central axis, and being substantially equiangularly spaced apart from each other about the central axis, each cutting arm including
        a cutting edge extending generally radially outward from the front end portion,
        a radially outer face extending generally axially rearward from a radially outermost end of the cutting edge,
        a leading face extending generally radially outward from, the front end portion and generally axially rearward of the cutting edge, and facing a rotational drilling direction of the cutting head,
        a trailing face extending generally radially outward from the front end portion and generally axially rearward of the cutting edge, and facing away from the rotational drilling direction of the cutting head, and
        a side chamfer surface extending at an angle between the radially outer face and the trailing face.

2. The cutting head of claim 1, wherein a projection of each cutting edge onto a plane perpendicular to the central axis is a straight unbroken line.

3. The cutting head of claim 1, wherein each cutting edge comprises at least a first section, a second section, and a third section, wherein a first point angle is defined between the first section on a first of the cutting arms and the first section on a second of the cutting arms, a second point angle is defined between the second section on the first of the cutting arms and the second section on the second of the cutting arms, and a third point angle is defined between the third section on the first of the cutting arms and the third section on the second of the cutting arms, the first point angle being different from the second point angle, and the second point angle being different from the third point angle.

4. The cutting head of claim 3, wherein in each of the cutting edges, the first section, the second section, and the third section is substantially straight and a first curved transition section extends between the first section and the second section, and a second curved transition section extends between the second section and the third section.

5. The cutting head of claim 3, wherein each cutting edge further comprises a fourth section.

6. The cutting head of claim 5, wherein the first point angle is between approximately 140° and approximately 150°, the second point angle is between approximately 105° and approximately 115°, the third point angle is between approximately 135° and approximately 145°, and the fourth point angle is between approximately 100° and approximately 110°.

7. The cutting head of claim 5, wherein the first point angle is between approximately 95° and approximately 120°, the second point angle is between approximately 100° and approximately 120°, the third point angle is between approximately 135° and approximately 145°, and the fourth point angle is between approximately 100° and approximately 110°.

8. The cutting head of claim 5, wherein the first section comprises approximately 17% to approximately 23% of the length of the cutting edge, the second section comprises approximately 8% to approximately 13% of the length of the cutting edge, the third section comprises approximately 22% to approximately 50% of the length of the cutting edge, and the fourth section comprises approximately 8% to approximately 13%, of the length of the cutting edge.

9. The cutting head of claim 1, wherein each cutting arm further comprises a rake face extending axially rearward from the cutting edge to the leading face, and a relief face extending axially rearward from cutting edge to the trailing face, and the rake face and the relief face each include a plurality of side faces corresponding to a plurality of sections of the cutting edge.

10. The cutting head of claim 9, wherein the rake face and the relief face of each cutting arm are angled symmetrically relative to a plane defined by the central axis and the cutting edge of the cutting arm.

11. The cutting head of claim 9, wherein an internal angle between the rake face and the relief face of each cutting arm is between approximately 80° and approximately 90°.

12. The cutting head of claim 1, wherein each cutting arm further comprises a rake face falling rearward from the cutting edge and a relief face falling rearward from cutting edge, each of the rake face and the relief face including a plurality of side faces corresponding to the sections of the cutting edge.

13. A cutting head for a drill bit, the cutting head comprising:
    a front end portion centered on a central axis of the cutting head; and
    at least four substantially identically shaped cutting arms extending radially outward from the front end portion a substantially identical radial distance from the central axis, and being substantially equiangularly spaced apart from each other about the central axis, each cutting arm including a cutting edge extending generally radially outward from the front end portion, each cutting edge including a first section, a second section, and a third section, wherein a first point angle is defined between the first section on a first of the cutting arms and the first section on a second of the cutting arms, a second point angle is defined between the second section on the first of the cutting arms and the second section on the second of the cutting arms, and a third point angle is defined between the third section on the first of the cutting arms and the third section on the second of the cutting arms, the first point angle being different from the second point angle, and the second point angle being different from the third point angle.

14. The cutting head of claim 13, wherein a projection of each cutting edge onto a plane perpendicular to the central axis is a straight unbroken line.

15. The cutting head of claim 13, wherein, in each of the cutting edges, the first section, the second section, and the third section is substantially straight and a first curved transition section extends between the first section and the second section, and a second curved transition section extends between the second section and the third section.

16. The cutting head of claim 15, wherein each cutting edge further comprises a fourth section, wherein a fourth point angle between the fourth section on the first of the cutting arms and the fourth section on the second of the cutting arms is different from at least one of the first point angle, the second point angle, and the third point angle.

17. The cutting head of claim 16, wherein the first point angle is between approximately 140° and approximately 150°, the second point angle is between approximately 105° and approximately 115°, the third point angle is between approximately 135° and approximately 145°, and the fourth point angle is between approximately 100° and approximately 110°.

18. The cutting head of claim 16, wherein the first point angle is between approximately 95° and approximately 120°, the second point angle is between approximately 110° and approximately 120°, the third point angle is between approximately 135° and approximately 145°, and the fourth point angle is between approximately 100° and approximately 110°.

19. The cutting head of claim 16, wherein, in each cutting edge, the first section comprises approximately 17% to approximately 23% of the length of the cutting edge, the second section comprises approximately 8% to approximately 13% of the length of the cutting edge, the third section comprises approximately 22% to approximately 50% of the length of the cutting edge, and the fourth section comprises approximately 8% to approximately 13%, of the length of the cutting edge.

20. A drill bit comprising:
a fluted section defining a central axis;
a cutting head coupled to an end of the fluted section, the cutting head including a front end portion centered on the central axis, and at least four substantially identically shaped cutting arms extending radially outward from the front end portion a substantially identical radial distance from the central axis, and being substantially equiangularly spaced apart from each other about the central axis,
wherein each cutting arm includes a cutting edge extending generally radially outward from the front end portion, a radially outer face extending generally axially rearward from a radially outermost end of the cutting edge, a leading face extending generally radially outward from the front end portion and generally axially rearward of the cutting edge, and facing a rotational drilling direction of the cutting head, a trailing face extending generally radially outward from the front end portion and generally axially rearward of the cutting edge, and facing away from the rotational drilling direction of the cutting head, and a side chamfer surface extending at an angle between the radially outer face and the trailing face.

* * * * *